Figure 1:
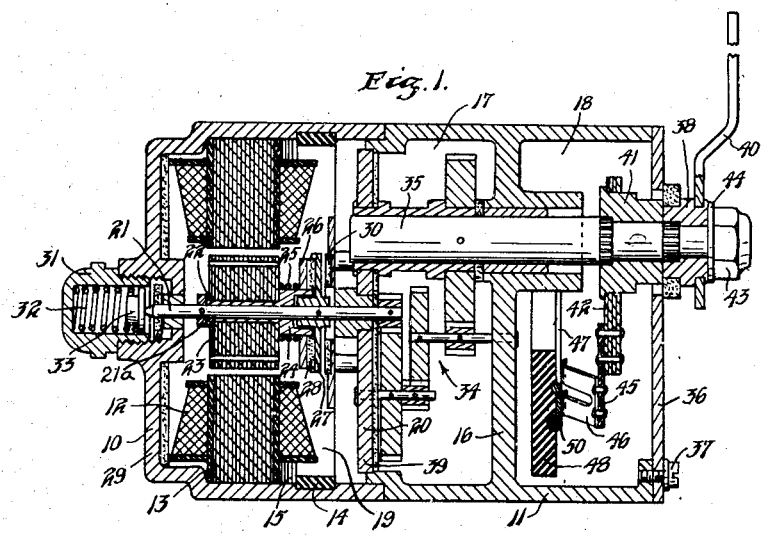

Nov. 15, 1949  LE ROY A. GRIFFITH  2,488,122
CUSHIONED STOP FOR ROTARY MEMBERS
Filed Feb. 19, 1943

Inventor
LE ROY A. GRIFFITH

By
George H Fisher
Attorney

Patented Nov. 15, 1949

2,488,122

UNITED STATES PATENT OFFICE 2,488,122

CUSHIONED STOP FOR ROTARY MEMBERS

Le Roy A. Griffith, Minneapolis, Minn., assignor to Minneapolis-Honeywell Regulator Company, Minneapolis, Minn., a corporation of Delaware Application February 19, 1943, Serial No. 476,425

10 Claims. (Cl. 192—139)

The present invention relates to motors, and particularly to motors which are utilized for driving a load device through a limited range of positions.

When a motor is used for driving a load device through a limited range of positions, a problem is encountered when the driven device reaches the limit of its travel, and the motor continues to be energized. This problem may be met either by providing a limit switch arrangement for deenergizing the motor, by providing a slipping clutch arrangement between the motor and its load so that the motor might continue to rotate after the load is stopped, or by letting the motor stall when the load device is stopped.

It is an object of the present invention to provide an improved motor unit for driving a load in either direction through a limited range of positions, in which the motor is allowed to stall when the load is stopped upon reaching either limit position.

Another object of the present invention is to provide, in a motor unit of the type described, improved resilient stop means for gradually stopping the load driven by the motor. A further object is to provide, in such a unit, positive stop means effective to stop the load driven by the motor after the resilient stop means has produced its maximum stopping effort.

A further object is to provide an improved resilient stop structure in which a member is stressed both in shear and in tension to absorb kinetic energy from the moving parts which are stopped thereby.

Another object of the present invention is to provide an improved friction clutch arrangement for permitting continued rotation of the motor after the load driven by the motor has been stopped.

A further object of the present invention is to provide an improved braking arrangement for stopping the load upon deenergization of the motor, and a clutch arrangement which permits the motor to continue to rotate under the influence of its own inertia after it has been deenergized without causing additional movement of the load.

A further object of the present invention is to provide a motor unit which is controllable by an electronic amplifier of the type disclosed in the co-pending application of Albert P. Upton, Serial No. 437,561, filed April 3, 1942, now Patent Number 2,423,534. A further object is to provide a motor unit which may be used with such an amplifier in a control system such as that shown in the co-pending application of Hubert T. Sparrow, Serial No. 476,797, filed February 22, 1943, now Patent No. 2,477,668, dated August 2, 1949. In both applications means are disclosed for energizing and deenergizing a motor. Thus the improved motor functions to position and hold its load at any point between its limits of travel through energization and deenergization controlled by the amplifier and supplemented by the motor brake, or to move its load to an extreme position where it is held by abutment means and the stalling of the energized motor.

Figure 2:
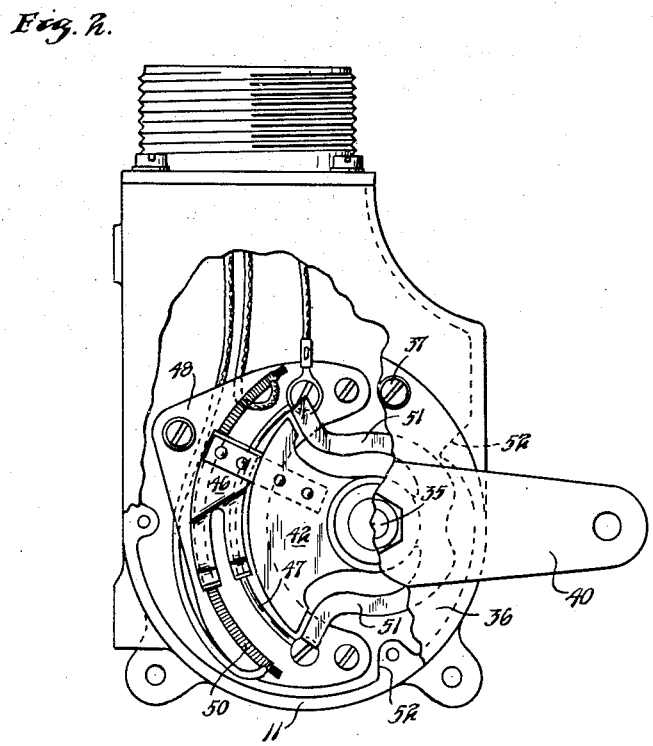

Other objects and advantages of the present invention will become apparent from a consideration of the appended specification, claims, and drawing, in which Figure 1 is a cross-sectional view of a motor unit embodying my invention, and Figure 2 is an end elevation of the device shown in Figure 1, certain of the parts being broken away, and the whole assembly being rotated through 90° from the position shown in Figure 1.

Referring to Figure 1, there is shown a housing which is divided into a generally cup-shaped portion 10 and a generally cylindrical portion 11. The cup-shaped portion 10 encloses a stator assembly generally indicated at 12. The stator assembly fits snugly against a shoulder 13 on the inside of the casing 10, and is held against that shoulder by a snap ring 14 and a spacer 15 between the snap ring and the stator assembly. The snap ring 14 engages another shoulder facing in the opposite direction from the shoulder 13. The stator assembly is generally similar to that described in detail in the co-pending application of Walter E. Edelman, Serial No. 436,455, filed March 27, 1942, now Patent Number 2,412,254.

The cylindrical portion 11 of the casing includes a central transverse wall 16, which separates the portion 11 into two chambers 17 and 18.

The chamber 17 is enclosed by a plate 20, which engages the rim of the cylindrical casing portion 11. The plate 20 and the cup-shaped casing portion 10 form another chamber 19, which encloses the stator structure just described.

A shaft 21 is journaled in the cup-shaped casing portion 10 and in the cover plate 20. The shaft 21 is mounted both for rotation and for limited translation as hereinafter more fully described. A sleeve 22 is mounted on the shaft 21 for free rotation thereon. A collar 21a fixed to the shaft 21 engages the left end of sleeve 22. A rotor 23 is fixed to the sleeve 22. The sleeve 22 is provided with a portion 24, of wider cross section than the portion which carries the rotor 23. A compression spring 25 surrounds the portion 24, and one end of spring 25 bears against the rotor 23. The opposite end of the spring 25 bears against a clutch member 26, which is slidably mounted on the sleeve portion 24, and biases the clutch member 26 to the right and into engagement with a second clutch member 27, which is fixed on the shaft 21. The left end of compression spring 25 bears against the rotor 23 and thus biases that member and the sleeve 22 to the left and into engagement with collar 21a. Thus the longitudinal movement of the rotor and sleeve assembly is confined to that portion of the shaft 21 between collar 21a and clutch member 27. One or both of the clutch members 26 and 27 may be provided with a surface of friction material, as indicated at 28.

There is attached to the cover plate 20, by any suitable means, a braking surface 30. Outside the casing portion 10, and adjacent the left end of shaft 21, is a hollow nut 31, which has an externally threaded portion which is received into a suitable internally threaded aperture in the casing portion 10. A compression spring 32 is carried within the hollow nut 31, and bears against a button 33, biasing the button to the right and into engagement with the end of shaft 21.

The effect of the spring 32 is therefore to bias the shaft 21 and the rotor assembly carried thereby for movement to the right from the position shown in the drawing, so that the right hand surface of clutch member 27 engages the braking surface 30. The shaft 21 and the rotor assembly are in that position when the windings of the stator 12 are deenergized. When the stator windings are energized, the rotor 23 is moved by magnetic attraction into alignment with the magnetic center of the stator, thereby moving the rotor assembly and the shaft 21 from the position just described to the position shown in the drawing. This is the running position of the rotor assembly and shaft 21.

Within the compartment 17 there is located a reduction gear mechanism 34, which it is believed unnecessary to describe in detail, except to state that this gear mechanism transmits motion from shaft 21 to an output shaft 35, which is suitably journaled in the wall 16.

The chamber 18 is closed by a suitable cover plate 36, which may be attached to the housing portion 11 by any suitable means such as the bolt 37. The output shaft 35 passes through a suitable aperture in the plate 36. Splined on the shaft 35 outside the cover 36 is a collar 38, on which is fixed an arm 40, by which the motor drives its load. For example, in the Sparrow application previously referred to, the load device is the waste gate of a turbine-driven supercharger.

Inside the chamber 18 a collar 41 is splined on the shaft 35. A nut 43 and washer 44 outside the casing portion 11 hold the collars 38 and 41 in position on the shaft 35.

The collar 41 has fixed thereon a laminated stop plate 42. The laminated stop plate 42 carries an insulating plate 45 which supports a contact structure 46. The contact 46 is of a generally U-shaped conformation, and is of a resilient material. One of the arms of the U-shaped contact 46 engages an arcuate contact 47, which is molded or otherwise suitably mounted in an insulating plate 48 carried by the casing 11. The other arm of the contact 46 engages a slidewire resistance element 50, which may also be molded in the insulating plate 48.

The stop plate 42 has a relatively wide central portion, on which the insulating plate 45 is supported, and a pair of oppositely extending integral wing portions 51 (see Figure 2).

The wing portions 51 extend from a point on the stop plate 42 which is circumferentially spaced from its central portion. These wing portions are considerably elongated, and conform generally to the sides of the central portion of the stop plate 42, but are spaced therefrom. The extremities of the wing portions are spaced laterally from the sides of the central portion of plate 42 by a relatively small gap, as shown in the drawing.

The inner surface of the housing 11 is formed into a pair of shoulders 52, which are so positioned with respect to the stop plate 42, that upon continued rotation of shaft 35 in either direction from the position shown in the drawing, one of the shoulders 52 will be engaged by the wing portion 51 which is adjacent to that shoulder. After this engagement of the wing portion 51 with the shoulder, continued rotation of the shaft 35 causes the wing portion to be bent toward the main portion of the stop plate 42.

The wing portions 51 are preferably designed so that the torque required to bend one against the main portion of the stop plate is greater than the friction torque between the clutch members 26 and 27. Therefore, when one of the wing portions engages the associated shoulder 52, the shaft 35 is stopped before the wing portion is bent back against the main portion of the plate 42. If the kinetic energy of the moving parts has not been absorbed at the time the shaft 35 is stopped, then the clutch members 26 and 27 slip with respect to each other, thereby relieving the strain which would otherwise be placed on the gear train 34. The characteristics of spring 25 are preferably such that the friction torque exerted on the rotor 23 when the clutch member 27 is stationary is greater than the stall torque of the motor. Under such conditions, slipping between the clutch members 26 and 27 continues only until the kinetic energy in the rotor is dissipated, whereupon the rotor stalls.

The main portion of the stop plate 42 functions as a positive stop for the shaft 35, but only under emergency conditions, as when an excessive load is placed on the arm 40, or when the motor runs the stop plate 42 against one of the shoulders 52 at very high speed.

It should be noted that the wing portions 51 are so formed that the surfaces which engage the shoulders 52 extend radially from the shaft 35, while the wing portions 51 themselves extend in a non-radial direction from their points of attachment to the main body of plate 42 to their free ends. Therefore, when one of the wing portions 51 is engaged by the shoulder 52, there is not only a shearing force acting on the wing portion, but a tension force tending to stretch the wing portion. The active shearing force is supplied by the shaft 35, while the reactive force is supplied by the shoulder 52.

It may be seen that the shaft 35 tends to slide the end of wing portion 51 over the shoulder 52, and the resistance to this sliding motion produces a tensional stress between the ends of wing portion 51.

The laminations of the stop plate 42 have been found to aid in the prevention of fatigue failures of the stop plate. If a single integral plate were used, a fatigue failure occurring in one portion of it might creep across the entire cross section, thereby causing failure of the entire stop plate. If the structure is laminated, however, a fatigue failure starting in one lamination will not creep beyond that lamination. Each lamination of the stop plate 42 is preferably stamped from a single sheet of suitable material.

If the motor is deenergized by action of the aforementioned devices with which the improved motor may be employed, through power failure, or for any other reason, the endwise movement of the rotor assembly causes engagement between clutch plate 27 and the braking surface 30, thereby preventing further movement of the arm 40 in either direction. At the same time, the rotor 23 may dissipate its inertia by continuing to rotate on the shaft 21, its rotation being opposed only by the friction of the clutch members 26 and 27.

The chambers 17 and 19 may be partially filled with oil, and the various bearings may be lubricated from that oil by means of felt pads 29 and 39 which line one side of the chambers 19 and 17.

While I have shown and described a preferred embodiment of my invention, other modifications thereof will appear to those skilled in the art, and I therefore wish my invention to be limited only by the appended claims.

I claim as my invention:

1. In combination, a shaft, reversible motor means for driving said shaft, a friction clutch positioned intermediate said motor and said shaft, a first member fixed on said shaft for rotation therewith, a stationary member located in the path of travel of said first member for limiting the rotation of said shaft, an element resiliently attached to one of said members and lying between said members, said element being normally spaced from both said members and effective upon movement of said first member toward said stationary member to slow the rotation of said shaft upon engagement of said element by the other of said members and until rotation of said shaft is stopped, said friction clutch being operable upon the stopping of said shaft by said members to permit continued rotation of said motor, and brake means for arresting movement of said shaft upon deenergization of said motor, said clutch means being operable upon the arrest of movement of said shaft by said brake means to permit continued rotation of said motor.

2. In combination, a rotatable shaft, reversible motor means for rotating said shaft, a first member fixed on said shaft for rotation therewith, stop means for limiting the rotation of said shaft comprising a pair of stationary members spaced on opposite sides of said first member and a pair of elongated elements of resilient material each fixed at one end to said shaft at a point thereon spaced circumferentially from said first member and each having its free end normally positioned between said first member and one of said stationary members, said elements and said members having interfitting surfaces oblique to a straight line passing through the ends of said element so that upon movement of said first member toward one of said stationary members, one of said elements is engaged by said stationary member and stressed both in shear and in tension by such engagement, brake means for arresting rotation of said shaft intermediate said stop means, and slip friction connection means between said shaft and said motor operable to permit rotation of said motor after stoppage of said shaft.

3. In combination, a rotatable shaft, motor means for driving said shaft, a gear train connecting said motor means to said shaft, resilient stop means for limiting the motion of said shaft, brake means associated with said shaft and operative upon deenergization of said motor means to lock said shaft against rotation, and friction clutch means connecting said motor means to said gear train, said friction clutch means remaining engaged and cooperating with said resilient means to relieve strain on said gear train when said motor is energized and said shaft is stopped by said stop means, and said friction clutch means remaining engaged and cooperating with said brake means to relieve the inertia of said motor means upon deenergization thereof without causing further motion of said shaft.

4. Electrical motor means, comprising in combination, a stator, a rotor, a stationary brake member, a shaft, a sleeve freely rotatable on said shaft for supporting said rotor, a first slip clutch member fixed on said shaft, a second slip clutch member carried by said sleeve and movable axially along said sleeve, and spring means carried by said sleeve and biasing said second clutch member into engagement with said first clutch member, means for moving the sleeve assembly axially upon deenergization of said motor means whereupon said first clutch member engages said stationary brake member to arrest rotative movement of said shaft, said clutch member cooperating under such conditions to permit continued rotation of said rotor, said clutch members cooperating to permit rotation of said rotor on said shaft when the load on said shaft exceeds a value determined by the characteristics of said spring means.

5. In combination, a shaft, reversible motor means for driving said shaft, a first member fixed on said shaft for rotation therewith, a stationary member located in the path of travel of said first member for limiting the rotation of said shaft, an elongated element of resilient material fixed to said shaft, said element being spaced from said first member over substantially its full length and having a free end normally positioned between said first member and said stationary member, said elongated element and said first member having interfitting surfaces oblique to a straight line passing through the ends of said element so that upon movement of said first member toward said stationary member said element becomes effective to gradually slow the rotation of said shaft upon engagement of said element by the other of said members and until rotation of said shaft is stopped, and frictional clutch means which is continuously operable connecting said motor and said shaft and permitting continued rotation of said motor after said shaft is stopped.

6. Electrical motor means comprising in combination, a stator, a rotor, a rotor shaft, a gear train connecting said rotor shaft to an output shaft, a friction clutch assembly including a sleeve freely rotatable on said rotor shaft for supporting said rotor, a first clutch member fixed on said shaft, a second clutch member carried by said sleeve and movable axially along said sleeve, spring means carried by said sleeve and biasing said second clutch member into engagement with said first clutch member, a resilient stop means for arresting rotation of said output shaft at selected positions and comprising, a first member fixed on said output shaft for rotation therewith, a stationary member located in the path of travel of said first member for limiting the rotation of said output shaft, one of said members being formed of a resilient material and comprising a main body portion formed so as to resist deformation in the direction of motion of said first member and an integral wing portion having a small dimension in the direction of motion of said first member so it may be deformed into engagement with said main portion, said integral wing portion cooperating with the other of said stop members upon engagement therewith to gradually slow the rotation of said shaft until the rotation of said shaft is stopped, said friction clutch means remaining yieldably engaged and cooperating with said resilient stop means to relieve the strain on said gear train by relative slippage of said clutch members when said motor is energized and said output shaft is stopped by said stop means.

7. In combination, a shaft, reversible motor means for driving said shaft, a friction clutch positioned intermediate said motor and said shaft and yieldably engaged under all conditions, a first member fixed on said shaft for rotation therewith, a stationary member located in the path of travel of said first member for limiting the rotation of said shaft, an integral element resiliently attached to one of said members and lying between said members, said integral element being normally spaced from both said members and effective upon movement of said first member toward said stationary member to slow the rotation of said shaft upon engagement of said integral element by the other of said members and until rotation of said shaft is stopped, said friction clutch being operable upon stopping of said shaft by said members to permit continued rotation of said motor.

8. Electrical motor means comprising in combination, a stator, a rotor, a rotatable shaft, an output shaft which is rotatable, a sleeve freely rotatable upon said first named shaft for supporting said rotor, a first slip clutch member fixed on said first named shaft, a second slip clutch member carried by said sleeve and movable axially along said sleeve, spring means carried by said sleeve and continuously biasing said second clutch member into engagement with said first clutch member, a gear train connecting said first named shaft and said first slip clutch member to said output shaft of the motor, resilient stop means for limiting the motion of said output shaft of the motor, said resilient stop means and said friction clutch cooperating to release the strain on said gear train when said output shaft is stopped by said resilient stop means and said motor including said stator and said rotor continue to be energized and run.

9. A device of the class described comprising, a motor means, a rotatable shaft driven by said motor means, a first member fixed on said shaft for rotation therewith, a stationary member located in the path of travel of said first member for limiting the rotation of said shaft, an elongated element of resilient material fixed to said shaft, said element being spaced from said first member over substantially its full length and having a free end normally positioned between said first member and said stationary member, said elongated element and said first member having interfitting surfaces oblique to a straight line passing through the ends of said element so that upon movement of said first member toward said stationary member said element becomes effective to gradually slow the rotation of said shaft upon engagement of said element by the other of said members and until rotation of said shaft is stopped, said fixed member operating to positively stop the rotation of said shaft upon engagement of said element and said fixed member and in the event of failure of said element upon engagement of said stationary member and said fixed member.

10. In combination, a motor means, a rotatable shaft driven by said motor means, and a resilient stop means including a movable member fixed to said shaft for rotation therewith and a pair of stationary members located in the path of travel of said movable member for limiting the rotation of said shaft, said movable member comprising a main body portion formed so as to resist deformation in the direction of motion of said first member and an integral elongated wing portion of resilient material which wing portion is spaced from said main body portion over substantially its full length, said wing portion having its extremities positioned between said main body portion and said stationary members so that upon movement of said movable member toward its stationary member said wing portion becomes effective to gradually slow the rotation of said shaft upon engagement of said wing portion by said stationary member, said main body portion operating to positively stop said shaft upon engagement with said wing portion and in the event of failure of said wing portion by engagement with said stationary member.

LE ROY A. GRIFFITH.

REFERENCES CITED

The following references are of record in the file of this patent:

UNITED STATES PATENTS

| Number | Name | Date |
| --- | --- | --- |
| Re. 22,574 | Collins | Dec. 5, 1944 |
| 503,420 | Johnston et al. | Aug. 15, 1893 |
| 1,417,093 | Molyneux | May 23, 1922 |
| 1,646,400 | Getz | Oct. 25, 1927 |
| 1,905,884 | Bean | Apr. 25, 1933 |
| 1,940,130 | Howell | Dec. 19, 1933 |
| 1,974,207 | Ellinger | Sept. 18, 1934 |
| 2,164,633 | Barrett | July 4, 1939 |
| 2,167,474 | Chudner | July 25, 1939 |
| 2,267,114 | Lear et al. | Dec. 23, 1941 |
| 2,372,096 | Lessmann et al. | Mar. 20, 1945 |